H. W. HARDING.
PROTECTIVE DEVICE FOR RUBBER TIRES.
APPLICATION FILED DEC. 30, 1907.
914,141.
Patented Mar. 2, 1909.
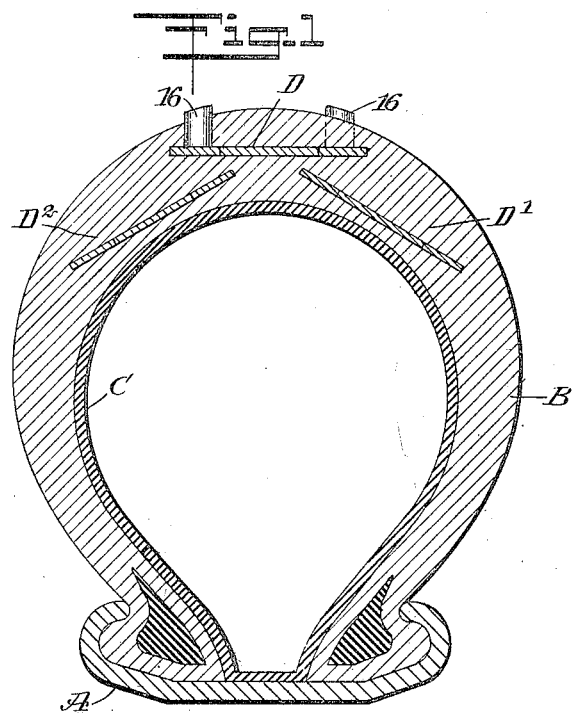
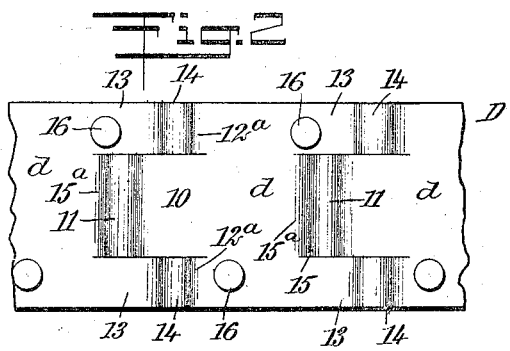
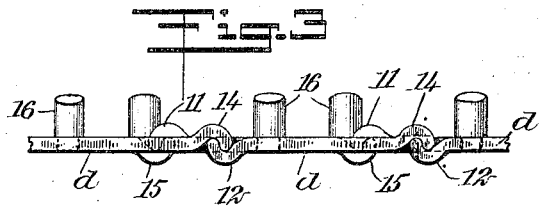
WITNESSES
INVENTOR
Henry W. Harding
BY
ATTORNEYS

UNITED STATES PATENT OFFICE.

HENRY W. HARDING, OF NEW YORK, N. Y.

PROTECTIVE DEVICE FOR RUBBER TIRES.

No. 914,141.  Specification of Letters Patent.  Patented March 2, 1909.

Application filed December 30, 1907. Serial No. 408,619.

*To all whom it may concern:*

Be it known that I, HENRY W. HARDING, a citizen of the United States, and a resident of the city of New York, borough of Manhattan, in the county and State of New York, have invented a new and useful Improvement in Protective Devices for Rubber Tires, of which the following is a full, clear, and exact description.

The purpose of the invention is to provide a chain or a series of chains especially constructed for introduction into pneumatic tires to protect the area of the tire most liable to puncture, said chains being so constructed and placed that their radial line from the center of the tire within the protected area will pass through at least one thickness of the metal used in the construction of the chains.

A further purpose of the invention is to provide the protective chains with spurs integral with or attached to the links, whereby to afford purchase and to prevent skidding, since said spurs penetrate the outer surface of the tire and enter the surface of the ground over which the wheel travels.

It is also a purpose of the invention to so construct and locate the chain armor in the tire as to not detract from its resiliency and tensile strength.

The invention consists in the novel construction and combination of the several parts as will be hereinafter fully set forth and pointed out in the claims.

Reference is to be had to the accompanying drawings forming a part of this specification, in which similar characters of reference indicate corresponding parts in all the figures.

Figure 1 is a transverse section through the rim of a wheel and a tire provided with the improved protective chain; Fig. 2 is a plan view of a portion of the protective chain; and Fig. 3 is an edge view of the portion of the chain shown in Fig. 2.

A represents a portion of the rim of a wheel, and B the outer, and C the inner tube of a pneumatic tire. In connection with the outer tube B, I employ three endless or ring-like chains designated respectively as D, D', and $D^2$. These chains are located one diametrically of the said tube opposite the central tread portion thereof, and the other two protective chains are located one at each side of the central chain, the side chains D' and $D^2$ being diagonal with reference to the central portion of the tread of the tire and extending beyond and beneath the side edges of the central chain D at their inner side portions, since the central chain D is by preference located above the inner or converging ends of the side chains D' and $D^2$.

Each chain D, D', and $D^2$ is of the same construction, being built up of a series of interlocking links $d$. The links $d$ of the chain are best shown in Figs. 2 and 3, wherein it will be observed that each link at one end is provided with a central projecting tongue 10 which terminates at its outer end in a downwardly curved hook 11, and the edge of the link at each side of the said tongue 10, which edges are designated as $12^a$, have extending therefrom upwardly curved hook terminals 12, as is best shown in Fig. 3. At the opposite end of each link, side tongues 13 are provided, and these side tongues 13 terminate in downwardly curved hook extensions or terminals 13, as is shown in Fig. 2. The edge $15^a$ of the link at this latter end portion is provided with an upwardly extending hook terminal 15, as is illustrated in Fig. 2, and in assembling the links $d$ of a chain, the downwardly extending hook terminals of the links are made to enter the upwardly extending hook terminals of the opposing or adjacent link, and in this manner the pivotal connection is obtained between the links forming a chain, without the aid of pintles or the equivalents thereof; the links of the chain are therefore interlocked in such manner that a chain in cross section represents substantially a straight line, as is shown in Fig. 1.

The construction of all of the protective chains is identical, as has been stated, except that the chain at the tread portion of the tire, or that one extending over or located between the diagonal chains D' and $D^2$, is provided with a series of spurs 16 that extend beyond the tread surface of the tire a sufficient distance to engage with the ground, thus offering a purchase for the wheel and also preventing skidding. Preferably the spurs at opposite sides of the chains are arranged to alternate, as is shown in Fig. 2, and the outer ends of opposing lines of spurs incline in direction of each other, as is shown in Fig. 1.

The interlocking connection between the links of a chain is such that when a chain is completed, and before its ends are connected to form a ring, it is practically flat upon both faces. The interlocking connection between the links is also such that the links are drawn close together, producing the effect of a continuous piece of material, yet enabling the protective chains to give with the tire whenever necessary.

In the construction of the links, instead of being straight as illustrated they may be curved to conform to the radius of the tire.

Having thus described my invention, I claim as new and desire to secure by Letters Patent,—

1. The combination with a tire, of a central ring-like chain embedded within the tire opposite its central tread portion, spurs carried by the said chain extending through the tire, similar chains also embedded within the tire and having a diagonal relation to the central chain, the central chain overlying the converging ends of the side chains, each of said chains being constructed of links, each link being provided at one end with a projecting tongue having a hook-like terminal having a downward inclination, and hook-like members at each side of the tongue having a reverse inclination, the opposite end of each link being provided with side tongues terminating in hooks having a downward inclination, and a hook-like terminal between said tongues having an upward inclination, whereby the terminal portions of the links are in interlocking engagement, and one link is held close to the other and all of the links have pivotal relation one with the other.

2. The combination with a tire, of a ring like chain embedded within the tire opposite its central tread portion, supports carried by the said chain extending through the tire, said chain being composed of links, each provided at one end with a projecting tongue having a hook like terminal with a downward inclination, and hook like members at each side of the tongue with a reverse inclination, the opposite end of each link being provided with side tongues terminating in hooks with a downward inclination, and a hook like terminal between said tongues with an upward inclination, whereby the terminal portions of the links are in interlocking engagement, and one link is held close to the other, and all of the links have a pivotal relation, one with the other.

3. In a device of the class described, a chain constructed of links, each having at one end a projecting tongue having a hook like terminal with a downward inclination, and a hook like member at each side of the tongue with a reverse inclination, the opposite end of each link being provided with side tongues terminating in hooks, with a downward inclination, and a hook like terminal between said tongues having an upward inclination.

In testimony whereof I have signed my name to this specification in the presence of two subscribing witnesses.

HENRY W. HARDING.

Witnesses:
J. FRED. ACKER,
EVERARD B. MARSHALL.